(No Model.)

E. J. SWEDLUND.
BICYCLE GEAR.

No. 519,933. Patented May 15, 1894.

WITNESSES:

INVENTOR
E. J. Swedlund
BY Munn & Co
ATTORNEYS.

THE NATIONAL LITHOGRAPHING COMPANY,
WASHINGTON, D. C.

UNITED STATES PATENT OFFICE.

ERICK J. SWEDLUND, OF ATWATER, MINNESOTA.

BICYCLE-GEAR.

SPECIFICATION forming part of Letters Patent No. 519,933, dated May 15, 1894.

Application filed June 3, 1893. Serial No. 476,513. (No model.)

*To all whom it may concern:*

Be it known that I, ERICK J. SWEDLUND, of Atwater, in the county of Kandiyohi and State of Minnesota, have invented a new and Improved Bicycle-Gear, of which the following is a full, clear, and exact description.

The invention relates to bicycle gears such as shown and described in Letters Patent No. 505,335, granted to me September 19, 1893.

The object of the invention is to provide certain new and useful improvements in bicycle gears, whereby the rider is enabled to travel with decreased speed and increased power, for conveniently riding up a hill or over rough roads, &c., without much exertion.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1:
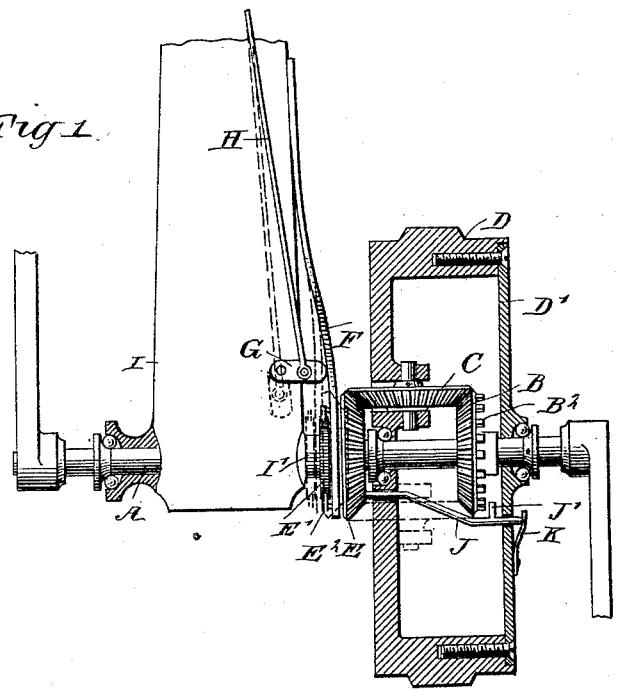
Figure 2:
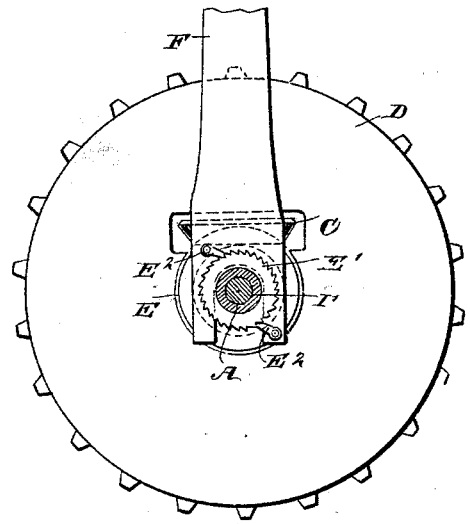
Figure 3:
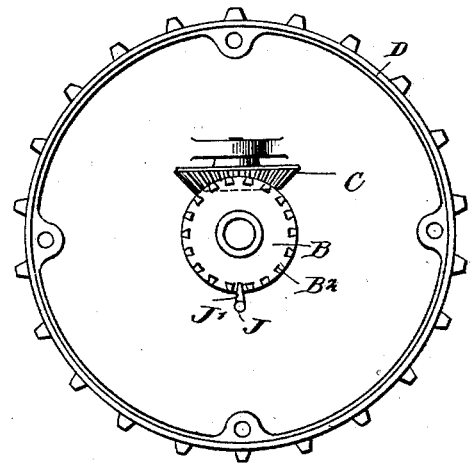

Figure 1 is a transverse section of the improvement as applied. Fig. 2 is a sectional side elevation of the same; and Fig. 3 is a face view of the chain wheel with the cover removed.

The bicycle gear is arranged on a pedal shaft A on which is fastened a bevel gear wheel B in mesh with a bevel gear wheel C, journaled inside of a hollow chain wheel B connected by the usual sprocket chain with a sprocket wheel on the bicycle wheel to be driven. The bevel gear wheel C extends through an opening in one side of the chain wheel D to the outside thereof and this outer part of the wheel C is adapted to be engaged by a bevel gear wheel E secured to the hub of a ratchet wheel E' and adapted to be moved transversely by a suitable mechanism under the control of the operator. This mechanism is preferably of the construction shown and described in the Letters Patent above referred to, and it consists principally of a forked spring arm F adapted to be engaged by a pivoted arm G connected by a link H with the brake rod of the bicycle, the said fork F being secured on the part of the bicycle frame I on which the arm G is pivoted.

When the arm G is swung downward by pulling the brake rod upward, then the spring arm F returns to its normal position indicated by dotted lines in Fig. 1, so as to move the gear wheel E out of mesh with the gear wheel C, but when the brake rod is moved downward then the arm G is swung upward, so that the spring arm F moves the gear wheel E in mesh with the gear wheel C. The ratchet wheel E' and the gear wheel E are mounted to turn together and to slide transversely on the projection I' of the bicycle frame I and a groove is formed between the ratchet E' and the gear wheel E in which the forks of the spring F rest.

On the spring arm F are pivoted pawls $E^2$ engaging the said ratchet wheel E', so that the said ratchet wheel and gear wheel E are free to turn in one direction, but are prevented from turning in the opposite direction. The gear wheel E is adapted to engage with its face a transversely-arranged rod J mounted to slide in suitable bearings in the chain wheel D, the forward end of the said rod being pressed on by a spring K, secured to a removable cover D' for the chain wheel D.

On the rod J is formed a projection J' adapted to be thrown in mesh with teeth $B^2$, formed on the face of the bevel gear wheel B, at the time the bevel gear wheel E is out of mesh with the bevel gear wheel C. When, however, the bevel gear wheel E is shifted in mesh with the bevel gear wheel C, as above described, then the said bevel gear wheel E also actuates the rod J to move the projection J' of the rod J out of mesh with the teeth on the bevel gear wheel B.

The operation is as follows: When the bicycle travels over an ordinarily good road, the bevel gear wheel E is out of mesh with the bevel gear wheel C and consequently the bevel gear wheel B is locked to the chain wheel D by the projection J' of the rod J, engaging the teeth $B^2$, so that the rotary motion of the pedal shaft A is transmitted by the bevel gear wheel B and the rod J to the chain wheel D, which latter is mounted to rotate loosely on the pedal shaft A. The rotary motion of the chain wheel D is transmitted by the sprocket chain to the sprocket wheel on the wheel to be driven. It will be seen that the chain wheel D makes one revolution for every revolution of the pedal shaft A. Now, when the rider goes up a hill or over a rough road and requires more power, he actuates the shifting mechanism for the bevel gear wheel E, so that the latter is moved in mesh with the bevel gear wheel C and at the same time the wheel B is unlocked, by the projection J' of the rod J moving out of contact with the teeth B². The chain wheel D now rotates loosely on the pedal shaft A, and the rotary motion of the latter is transmitted by the bevel gear wheel B to the bevel gear wheel C, which latter rolls off on the stationary bevel gear wheel E, so that a slow rotary motion is given to the chain wheel D. Thus, the speed of the bicycle is decreased but the power is increased to enable the rider to easily and conveniently ride up a hill or pass over a rough road.

The bevel gear wheel E is mounted to turn in one direction, so as to permit of throwing the gear wheel conveniently into mesh with the bevel gear wheel C, without danger of breaking the teeth, as the said bevel gear wheel E is free to rotate in the same direction as the bevel gear wheel C at the time the latter rolls off the bevel gear wheel E when the chain wheel D and the bevel gear wheel B are locked together.

The chain wheel D is provided with the removable cover D' to permit of conveniently placing the bevel gear wheels B and C and the rod J in position, it being understood that the said hollow chain wheel containing the said mechanism prevents dust or impurities from clogging up this part of the device.

Having thus fully described my invention, I claim as new and desire to secure by Letters Patent—

1. In a bicycle gear, the combination with a pedal shaft, of a chain wheel mounted to rotate loosely thereon, a bevel gear wheel carried by the chain wheel, a bevel gear wheel secured on the pedal shaft and meshing with the gear wheel carried by the chain wheel, a sliding bevel gear wheel adapted to be thrown in and out of mesh with the bevel gear wheel carried by the chain wheel and means for locking the gear wheel on the pedal shaft to the chain wheel, substantially as shown and described.

2. In a bicycle gear, the combination with a pedal shaft, and a bevel gear wheel secured thereon, of a hollow chain wheel mounted to rotate loosely on the said pedal shaft, a bevel gear wheel journaled in the said hollow chain wheel and in mesh with the said bevel gear wheel on the pedal shaft, a sliding bevel gear wheel adapted to be thrown in and out of mesh with the said bevel gear wheel in the chain wheel, and a mechanism carried by the said chain wheel and adapted to be actuated by the said sliding bevel gear wheel to lock or unlock the said chain wheel and the bevel gear wheel on the pedal shaft, substantially as shown and described.

3. In a bicycle gear, the combination with a pedal shaft, and a bevel gear wheel secured thereon, of a hollow chain wheel mounted to rotate loosely on the said pedal shaft, a bevel gear wheel journaled in the said hollow chain wheel and in mesh with the said bevel gear wheel on the pedal shaft, a sliding bevel gear wheel carried by the frame and adapted to be thrown in and out of mesh with the said bevel gear wheel in the chain wheel, means, substantially as described, for imparting a sliding motion to the said bevel gear wheel, and a spring-pressed rod mounted to slide transversely in the said chain wheel and having a projection adapted to engage teeth on the bevel gear wheel on the pedal shaft, substantially as shown and described.

ERICK J. SWEDLUND.

Witnesses:
L. F. DAVIDSON,
P. O. HALL.